United States Patent

Ogawa

Patent Number: 5,666,574
Date of Patent: Sep. 9, 1997

[54] PHOTO-DETECTION METHODS AND APPARATUS

[75] Inventor: Tadayoshi Ogawa, Kyoto, Japan

[73] Assignee: Rohm Co., Ltd., Japan

[21] Appl. No.: 678,641

[22] Filed: Jul. 10, 1996

[30] Foreign Application Priority Data

Jul. 31, 1995 [JP] Japan .................................. 7-194801

[51] Int. Cl.⁶ ............................... G01J 1/42; G03B 7/08
[52] U.S. Cl. ................. 396/233; 250/208.2; 250/208.5
[58] Field of Search ....................... 396/233; 348/42.6; 250/208.2, 208.5

[56] References Cited

U.S. PATENT DOCUMENTS 5,534,968  7/1996  Takagi ........................ 396/233
5,541,706  7/1996  Goto ........................... 396/233

Primary Examiner—Safet Metjahic
Assistant Examiner—Michael Dalakis
Attorney, Agent, or Firm—Majestic, Parsons, Siebert & Hsue

[57] ABSTRACT

Light is made incident on a pair of photo-sensors having different sensitivity characteristics. One of them has higher spectroscopic sensitivity than the other within a specified range of wavelength, but the other has spectroscopic sensitivity over a wider range of wavelength than this specified range. Both of the photo-sensors are adjusted so as to have approximately same photo-sensitivity against external background light. A difference current with intensity equal to the difference between the currents generated by this pair of photo-sensors is obtained by a subtraction circuit and is compressed by a compression circuit by a specified ratio, and the compressed current thus obtained is outputted.

5 Claims, 3 Drawing Sheets

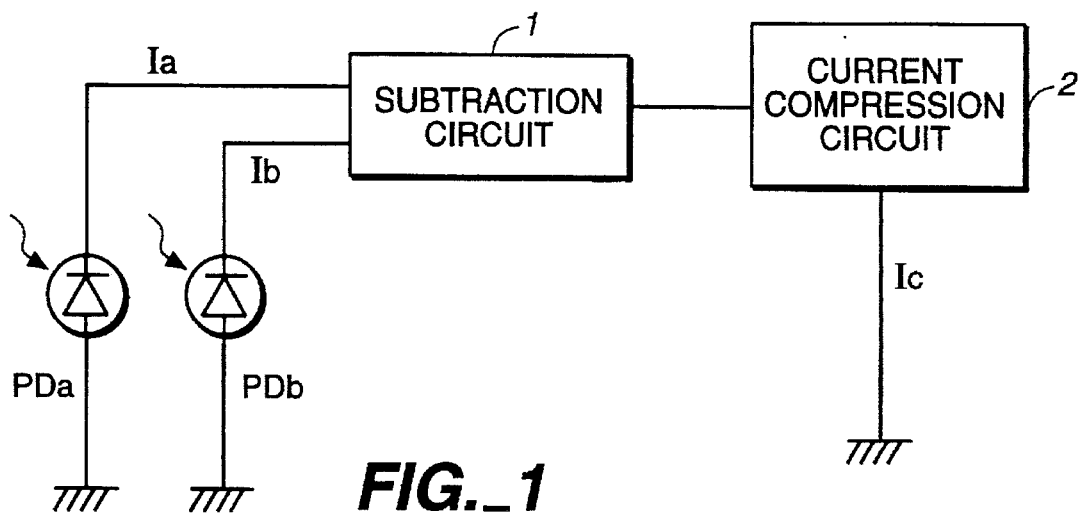
FIG._1
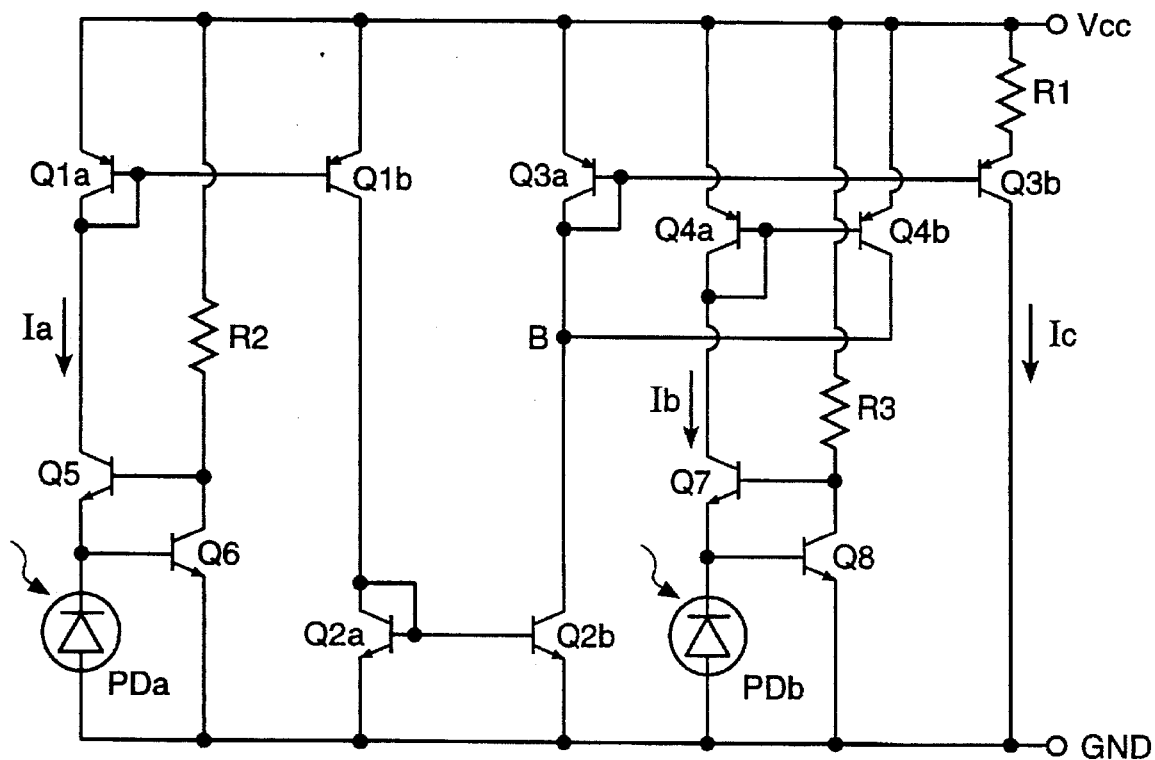
FIG._2

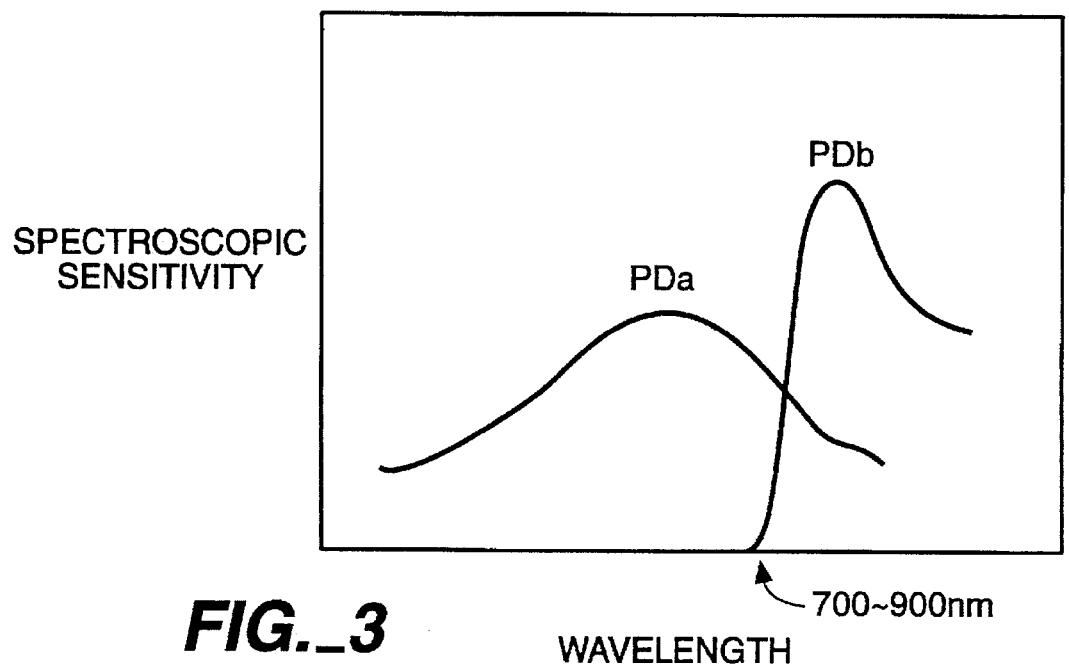
FIG._3
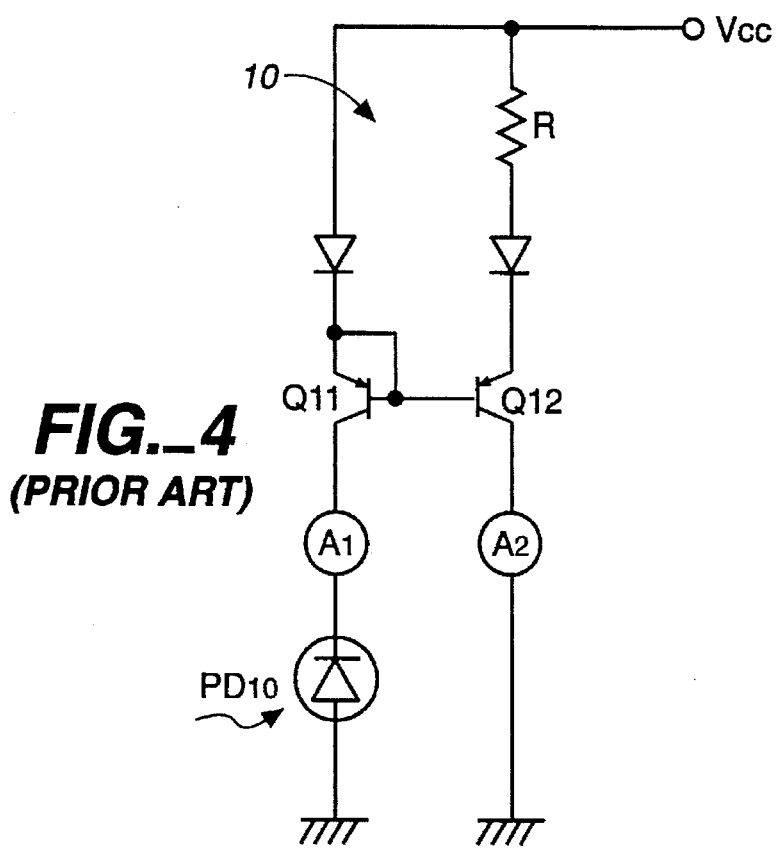
FIG._4
(PRIOR ART)

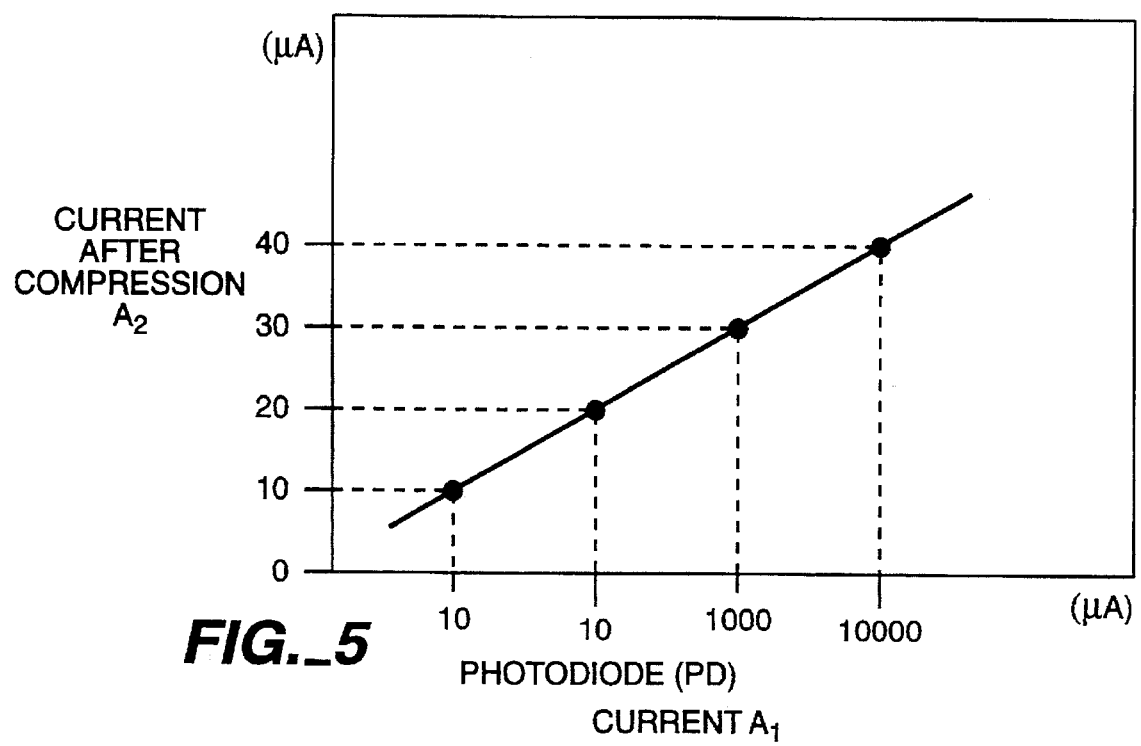
FIG._5
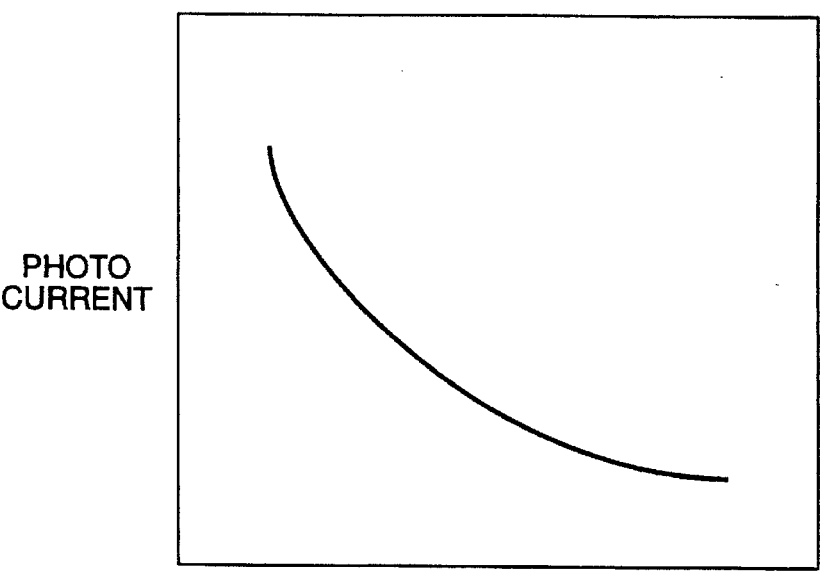
FIG._6

PHOTO-DETECTION METHODS AND APPARATUS

BACKGROUND OF THE INVENTION

This invention relates to methods of photo-detection for photo-detectors in photo-electronic devices such as static and video movie cameras and image sensors and for photo-telecommunication such as electronic notebooks and personal computers, as well as to optical detectors using such methods.

As an example of photo-detector incorporated, for example, in a remote-control cameras and video movie cameras, FIG. 4 shows a remote-control light-receiving circuit incorporated in a prior art electronic device. A photodiode $PD_{10}$ is provided to serve as a light-receiving sensor in this light-receiving circuit, but the photo-current thereby obtained is due not only to a light signal from a light source (not shown) serving as a light emitter but also to external light. Since the photo-current due to the light source varies inversely proportional to the square of the distance between the light source and the light-receiving sensor, as shown in FIG. 6, a large photo-current can be obtained as the light-receiving sensor approaches the light source.

With prior art light-receiving circuits, therefore, it is often attempted to expand the dynamic range of the output current by compressing the photo-current as shown in FIG. 5 such that telecommunication within a range of distance between several centimeters and several meters can be carried out dependably. The light-receiving circuit shown in FIG. 4 comprises a current mirror circuit 10 with a first transistor $Q_{11}$, to the collector of which is connected the photodiode $PD_{10}$, and a second transistor $Q_{12}$ opposite thereto, a resistor R being connected between the emitter of the second transistor $Q_{12}$ and a power source $V_{cc}$, thereby forming a current compression circuit of which the ratio of current compression is determined by the resistance of this resistor R. With a current compression circuit thus structured, it is possible, as shown in FIG. 5, to obtain an approximately logarithmically compressed output current $A_2$, as the collector current of the second transistor $Q_{12}$, from an input current $A_1$ through the photodiode $PD_{10}$.

With prior art light-receiving circuits, however, not only the photo-current due to external light but also the photo-current due to the signal light is compressed. When the external light is much stronger than the signal light, the signal current from the signal light becomes too weak. Table 1 shows an example which compares the compressed current, with and without fairly strong external light, when the signal current component flowing through the photo-diode $PD_{10}$ is 10 μA. Let the current produced by the strong external light be 1000 μA such that the total photodiode (PD) current $A_1$ through the photodiode $PD_{10}$ will be 1010 μA and 10 μA, respectively with and without the external light. FIG. 5 shows that the compressed current obtained therefrom will be 30.3 μA and 10 μA, respectively. Since the PD current through the photodiode $PD_{10}$ due only to the external light will be 30 μA according to FIG. 5, this means that the signal current after the compression is only 0.3 μA (=30.3 μA−30.0 μA), which is too weak to be practically usable. In other words, prior art cameras and video movies could not be remote-controlled if the daylight was too strong.

TABLE 1

|  | With external light | Without external light |
|---|---|---|
| Signal current (μA) | 10 | 10 |
| External-light current (μA) | 1000 | 0 |
| PD current (μA) | 1010 | 10 |
| Total current after compression (μA) | 30.3 | 10 |
| Signal current after compression (μA) | 0.3 | 10 |

One of the methods of avoiding the effects of external light was to shorten the distance between the light source and the light-receiving sensor. A strong signal current can always be obtained by this method, independently of the intensity of the external light, but the use is severely limited to the immediate vicinity of the light source. This problem persists not only when electronic notebooks and personal computers of a laptop type are used outdoors for optical data telecommunication but also when they are used in the presence of an incandescent lamp.

SUMMARY OF THE INVENTION

It is therefore an object of this invention to obviate such problems of prior art apparatus and to provide optical detection methods and apparatus for electronic devices such as video movie cameras and photo-telecommunication devices, capable of reliable photo-detection independent of the intensity of external light such that telecommunication will not be interrupted when extra external light is made incident.

This invention is based on the discovery by the inventor that random noise due to external light can be removed and a stable dynamic range can be obtained if a pair of optical sensors with different spectroscopic sensitivity characteristics is used and their sensitivities to background light (external light) is preliminarily matched, and if the difference between their photocurrents is obtained at the time of sensing. Thus, according to this invention, light is made incident on a pair of photo-sensors having different sensitivity characteristics. One of them has higher spectroscopic sensitivity than the other within a specified range of wavelength, but the other has spectroscopic sensitivity over a wider range of wavelength than this specified range. Both of the photo-sensors are adjusted so as to have approximately same photo-sensitivity against external background light. A difference current with intensity equal to the difference between the currents generated by this pair of photo-sensors is obtained by a subtraction circuit and compressed by a compression circuit by a specified ratio, and the compressed current thus obtained is outputted.

According to this invention, effects of external light can be eliminated by obtaining the difference between the currents in a pair of photo-sensors having same spectroscopic sensitivity characteristics against external light such that a photo-detector with a stable dynamic range can be obtained.

BRIEF DESCRIPTION OF THE DRAWINGS

The accompanying drawings, which are incorporated in and form a part of this specification, illustrate embodiments of the invention and, together with the description, serve to explain the principles of the invention. In the drawings:

FIG. 1 is a block diagram of a remote-control light-receiving circuit according to this invention;

FIG. 2 is a circuit diagram of the subtraction and current compression circuits of FIG. 1;

FIG. 3 shows the spectroscopic sensitivity-wavelength characteristic of the pair of light-receiving sensors in the circuit of FIG. 2;

FIG. 4 is a circuit diagram of a prior art remote-control light-receiving circuit;

FIG. 5 is a graph which shows the relationship between the current after compression and the photodiode current for the prior art circuit of FIG. 4; and FIG. 6 is a graph which shows the general relationship between the photo-current of a photodiode and the distance from the light source.

DETAILED DESCRIPTION OF THE INVENTION

FIG. 1 shows schematically the structure of a remote control light-receiving circuit embodying this invention for infrared remote control telecommunication. A pair of photo-diodes $PD_a$ and $PD_b$ are provided as light-receiving sensors for sensing infrared light from an infrared emitter (not shown), and photo-currents $I_a$, $I_b$ obtained thereby are inputted to a subtraction circuit 1 from which their difference is outputted. A current representing this difference is compressed by a current compression circuit 2 from which an output current $I_c$ is obtained. The light-receiving sensors may each comprise a discrete infrared light-receiving element made by molding a transparent resin material.

As shown in FIG. 3, the two photo-diodes $PD_a$ and $PD_b$ have mutually different spectroscopic sensitivity characteristics, the former having a more or less uniform sensitivity throughout the wavelength range while the latter has zero sensitivity in a low-wavelength region below, say, about 700–900 nm but is adapted to receive the infrared light from the infrared emitter and to thereby output a photo-current corresponding thereto. These two photo-diodes, however, are set such that their sensitivity characteristics are the same against the external light throughout its wavelength range. This may be accomplished either by using light-receiving sensors with appropriately adjusted light-receiving areas or by using circuits such as amplifiers to adjust the sensor outputs such that they have practically the same sensitivity to background light. Because such sensitivity adjustment is effected and incident light with wavelength shorter than 700–900 nm is also detected, the first photo-diode $PD_a$ outputs a much weaker photo-current than the second photo-diode $PD_b$ in response to infrared light.

The subtraction circuit 1 and the current compression circuits 2 may be structured for example as shown in FIG. 2. The current generating circuit for generating a photo-current from the first photo-diode $PD_a$ comprises a first current mirror circuit formed with a pair of transistors $Q_{1a}$ and $Q_{1b}$ and a second current mirror circuit which is formed with another pair of transistors $Q_{2a}$ and $Q_{2b}$ and serves to invert the collector current of transistor $Q_{1b}$, the photo-diode $PD_a$ being connected to the collector of transistor $Q_{1a}$, of which the base and the collector are connected to each other. Transistor $Q_5$ is inserted between transistor $Q_{1a}$ and the photo-diode $PD_a$ such that the collector and the emitter of transistor $Q_5$ are respectively connected to the collector of transistor $Q_{1a}$ and the photo-diode $PD_a$. Transistor $Q_6$ has its base connected to the emitter of transistor $Q_5$, its collector connected to the base of transistor $Q_5$, and its collector connected through a resistor $R_2$ to a power source $V_{cc}$. These two transistors $Q_5$ and $Q_6$ may be said to form the current detection circuit for photo-current $I_a$.

The current generating circuit for generating a photo-current from the second photo-diode $PD_b$ comprises a third current mirror circuit formed with a pair of transistors $Q_{4a}$ and $Q_{4b}$, the photo-diode $PD_b$ being connected to the collector of transistor $Q_{4a}$, of which the base and the collector are connected to each other. The collector of transistor $Q_{4b}$ of the third current mirror is connected to the collector of aforementioned transistor $Q_{2b}$. Transistor $Q_7$ is inserted between transistor $Q_{4a}$ and the photo-diode $PD_b$ such that the collector and the emitter of transistor $Q_7$ are respectively connected to the collector of transistor $Q_{4a}$ and the photo-diode $PD_b$. Transistor $Q_8$ has its base connected to the emitter of transistor $Q_7$, its collector connected to the base of transistor $Q_7$, and its collector connected through a resistor $R_3$ to the power source $V_{cc}$. These two transistors $Q_7$ and $Q_8$ may be said to form the current detection circuit for photo-current $I_b$.

The photo-current $I_a$ generated by the first photo-diode $PD_a$ appears through the first current mirror circuit as the collector current of transistor $Q_{2b}$ of the second current mirror circuit. The photo-current $I_b$ generated by the second photo-diode $PD_b$ appears through the third current mirror circuit as the collector current of transistor $Q_{4b}$.

There is a fourth current mirror circuit comprising a pair of transistors $Q_{3a}$ and $Q_{3b}$. The collector of transistor $Q_{3a}$ is connected to a junction B between the collectors of transistors $Q_{2b}$ and $Q_{4b}$. The other transistor $Q_{3b}$ of the fourth current mirror circuit is an output stage transistor for obtaining a photo-current output. Current $I_b$ is thus subtracted from current $I_a$ at the junction B by the operation of the fourth current mirror, and the inversion of the subtracted current $(I_a-I_b)$ is generated on the side of transistor $Q_{3b}$. This circuit connection whereby the current subtraction is effected at the junction B may be said to form the subtraction circuit 1 of FIG. 1.

A resistor $R_1$ is connected between the power source $V_{cc}$ and the collector of transistor $Q_{3b}$ of the fourth current mirror circuit, and the compressed output current $I_c$ is obtained as the collector current of transistor $Q_{3b}$. The ratio of compression can be adjusted by varying the resistance of this resistor $R_1$. It may therefore be considered to form the current compression circuit 2 adapted to compress approximately logarithmically the subtracted current obtained by the subtraction circuit 1.

Table 2 shows an example of light detection by the light-receiving circuit described above, comparing the compressed currents when an ordinary remote control photo-diode is used with and without relatively strong incident external light. The signal current component flowing through the first photodiode $PD_a$ by receiving infrared light from an infrared emitter is to be 5 μA. The signal current component at the second photodiode $PD_b$ due to the difference in spectroscopic sensitivity characteristics is to be 10 μA. Since the sensitivity characteristics against external light are matched for the two photo-diodes, as explained above, the photo-current due to the incidence of strong external light is the same for them. Let it be 1000 μA.

When there is no external light, currents $I_a$ and $I_b$ are 5 μA and 10 μA, respectively, and the difference of 5 μA (10–5) is outputted from the subtraction circuit 1 and is compressed by the current compression circuit 2 to obtain compressed output current $I_c$. If the external light as described above is made incident together with the infrared light, currents $I_a$ and $I_b$ increase respectively to 1005 μA and 1010 μA. Because the portions thereof corresponding to the external light cancel by going through the subtraction circuit 1, the output from the subtraction circuit is also 5 μA (1010–1005). In other words, the same current is outputted from the subtraction circuit 1 whether or not there is incident external light, the same output current $I_c$ being obtained. In summary, it is possible to secure a dynamic range which enables reliable remote-control reception of signals independent of the presence or absence of external light or the intensity of external light that may be present.

TABLE 2

|  | With external light | | Without external light | |
| --- | --- | --- | --- | --- |
|  | PDa | PDb | PDa | PDb |
| Signal current (mA) | 5 | 10 | 5 | 10 |
| External-light current (mA) | 0 | 0 | 1000 | 1000 |
| Total current (mA) | 5 | 10 | 1005 | 1010 |
| Current after subtraction (mA) | 5 | | 5 | |

What is claimed is:

1. A photo-detection method comprising the steps of:

causing a pair of photo-sensors to receive light, one of said photo-sensors having higher spectroscopic sensitivity than the other thereof within a specified range of wavelength, the other of said photo-sensors having spectroscopic sensitivity over a wider range of wavelength than said specified range, both of said photo-sensors having approximately same photo-sensitivity against external background light;

obtaining a difference current equal to the difference between currents generated by said pair of photo-sensors;

compressing said difference current by a specified ratio to obtain a compressed current; and outputting said compressed current.

2. The method of claim 1 wherein said difference current is approximately logarithmically compressed.

3. A photo-detector comprising:

a pair of photo-sensors consisting of a first photo-sensor and a second photo-sensor, said first photo-sensor having higher spectroscopic sensitivity than said second photo-sensor within a specified range of wavelength, said second photo-sensor having spectroscopic sensitivity over a wider range of wavelength than said specified range, photo-sensitivity characteristics of said first and second photo-sensors being approximately the same against external background light;

a subtraction circuit for outputting a difference current equal to the difference between currents generated by said pair of photo-sensors; and a compression circuit for compressing said difference current by a specified ratio to obtain a compressed current and outputting said compressed current.

4. The photo-detector of claim 3 wherein said compression circuit serves to compress said difference current approximately logarithmically.

5. The photo-detector of claim 3 wherein said specified range is an infrared region of said second photo-sensor.

* * * * *